(12) United States Patent
Lim et al.

(10) Patent No.: US 9,078,183 B2
(45) Date of Patent: Jul. 7, 2015

(54) DATA FORWARDING METHOD AND SYSTEM FOR VERTICAL HANDOVER

(75) Inventors: Chae Gwon Lim, Seoul (KR); Tae Sun Yeoum, Seoul (KR); Sung Ho Choi, Suwon-si (KR); Jong Moon Chung, Seoul (KR); William Jin Ho Song, Seoul (KR); Dae Young Lee, Seoul (KR)

(73) Assignees: Samsung Electronics Co., Ltd., Suwon-si (KR); Industry-Academic Cooperation Foundation, Yonsei University, Seoul (KR)

( * ) Notice: Subject to any disclaimer, the term of this patent is extended or adjusted under 35 U.S.C. 154(b) by 392 days.

(21) Appl. No.: 13/127,095

(22) PCT Filed: Oct. 29, 2009

(86) PCT No.: PCT/KR2009/006290
§ 371 (c)(1),
(2), (4) Date: May 2, 2011

(87) PCT Pub. No.: WO2010/050758
PCT Pub. Date: May 6, 2010

(65) Prior Publication Data
US 2011/0211559 A1    Sep. 1, 2011

(30) Foreign Application Priority Data
Oct. 31, 2008  (KR) .................. 10-2008-0107958

(51) Int. Cl.
*H04W 4/00* (2009.01)
*H04W 36/00* (2009.01)
*H04W 36/02* (2009.01)

(52) U.S. Cl.
CPC .................................... *H04W 36/02* (2013.01)

(58) Field of Classification Search
USPC ................................ 370/331–334, 465–467; 455/432.1–434, 436–444
See application file for complete search history.

(56) References Cited

U.S. PATENT DOCUMENTS

| | | | |
|---|---|---|---|
| 7,489,659 B2 * | 2/2009 | Siorpaes et al. | 370/331 |
| 7,813,319 B2 * | 10/2010 | Dutta et al. | 370/331 |
| 2002/0141360 A1 * | 10/2002 | Baba et al. | 370/331 |
| 2004/0221042 A1 * | 11/2004 | Meier | 709/227 |
| 2004/0264476 A1 * | 12/2004 | Alarcon et al. | 370/395.52 |
| 2005/0053034 A1 | 3/2005 | Chiueh | |

(Continued)

FOREIGN PATENT DOCUMENTS

WO    2008/069412 A1    6/2008

*Primary Examiner* — Thai Hoang
(74) *Attorney, Agent, or Firm* — Jefferson IP Law, LLP (57) ABSTRACT

A data forwarding method and system is provided for avoiding data loss during a vertical handover by forwarding data through an IP tunnel established between a newly introduced network entity called a Data Forwarding Function of the serving network and a Forward Attachment Function of a target network. A data forwarding method of a data forwarding unit located in a serving network for a vertical handover according to the present invention includes receiving an address of a forwarding attachment unit located in a target network and a data forwarding preparation request that are transmitted by a user equipment; establishing an Internet Protocol (IP) tunnel to the forwarding attachment unit according to the data forwarding preparation request; and forwarding, when a vertical handover is initiated, handover packets to the forwarding attachment unit through the IP tunnel.

4 Claims, 10 Drawing Sheets

(56) References Cited

U.S. PATENT DOCUMENTS

| | | | |
|---|---|---|---|
| 2005/0119001 A1* | 6/2005 | Watanabe | 455/436 |
| 2005/0176473 A1* | 8/2005 | Melpignano | 455/574 |
| 2006/0045049 A1* | 3/2006 | Chung et al. | 370/331 |
| 2006/0050674 A1* | 3/2006 | Lee et al. | 370/338 |
| 2006/0104252 A1* | 5/2006 | Song et al. | 370/338 |
| 2006/0120329 A1* | 6/2006 | Kim et al. | 370/331 |
| 2007/0002833 A1* | 1/2007 | Bajic | 370/352 |
| 2007/0147298 A1* | 6/2007 | Miao et al. | 370/331 |
| 2007/0171881 A1* | 7/2007 | Zhang et al. | 370/338 |
| 2007/0189218 A1* | 8/2007 | Oba et al. | 370/331 |
| 2007/0206538 A1* | 9/2007 | Mizukoshi et al. | 370/331 |
| 2008/0259871 A1 | 10/2008 | Baek et al. | |
| 2010/0088400 A1* | 4/2010 | Andreasen et al. | 709/223 |
| 2010/0165947 A1* | 7/2010 | Taniuchi et al. | 370/331 |
| 2010/0195621 A1* | 8/2010 | Kekki et al. | 370/332 |
| 2012/0147874 A1* | 6/2012 | Kotecha | 370/338 |
| 2013/0028145 A1* | 1/2013 | Arora | 370/259 |

* cited by examiner

DATA FORWARDING METHOD AND SYSTEM FOR VERTICAL HANDOVER

TECHNICAL FIELD

The present invention relates to wireless communications and, in particular, to a data forwarding method and system for avoiding data loss during a vertical handover by forwarding data through an Internet Protocol (IP tunnel established between a newly introduced network entity called a Data Forwarding Function of the serving network and a Forward Attachment Function of a target network.

BACKGROUND ART

Handover, or handoff, is a technology for switching a connection of a mobile node from one network to another network while maintaining ongoing communication session.

Typically, handover means a horizontal handover occurring between homogeneous networks. The notion of vertical handover has been introduced with the deployments of different wireless technologies-based communication networks, and various vertical handover technologies have been developed and standardized to efficiently switching the connection of the mobile node between heterogeneous networks. Unlike the horizontal handover occurring between the homogeneous networks, e.g. between Wireless Broadband Internet (WiBro) networks, the vertical handover is a handover occurring between the networks using different technologies, e.g. a WiBro network and a cellular network such as $2^{nd}$ Generation (2G) or $3^{rd}$ Generation (3G) network or an Institute of Electrical and Electronics (IEEE) 802.11-based Wireless Local Area Network (WLAN).

In the vertical handover method, a pre-registration procedure is performed to authenticate the mobile node prior to the execution of the vertical handover, such that the handover to a target network is performed quickly without additional handover preparation process. However, there is no detailed signaling mechanism specified for handover request or instruction to serving network, whereby the data forwarding from the serving network to the target network is likely to fail, resulting in data loss.

There is therefore a need for a data forwarding method that is capable of minimizing the data loss during the vertical handover between heterogeneous networks.

DISCLOSURE OF INVENTION

Technical Problem

In order to overcome the problems of the prior art, the present invention provides an data forwarding method and system for a vertical handover that is capable of minimizing data loss during the vertical handover between heterogeneous networks by establishing an IP tunnel between a newly introduced network element called a Data Forwarding Function of the serving network and a Forward Attachment Function of a target network on the network layer and transmitting the data through the IP tunnel.

Solution to Problem

In accordance with an exemplary embodiment of the present invention, a data forwarding method of a data forwarding unit located in a serving network for a vertical handover includes receiving an address of a forwarding attachment unit located in a target network and a data forwarding preparation request that are transmitted by a user equipment; establishing an Internet Protocol (IP) tunnel to the forwarding attachment unit according to the data forwarding preparation request; and forwarding, when a vertical handover is initiated, handover packets to the forwarding attachment unit through the IP tunnel.

In accordance with another exemplary embodiment of the present invention, a data reception method of a forwarding attachment unit located in a target network for a vertical handover includes establishing, when an Internet Protocol (IP) tunnel request is received from a data forwarding unit located in a serving network, an IP tunnel with the data forwarding unit; and receiving, when a vertical handover is initiate, handover packets transmitted by the data forwarding unit through the IP tunnel.

In accordance with another exemplary embodiment of the present invention, a data forwarding method for a vertical handover of a user equipment includes acquiring an address of a data forwarding unit located in a serving network and an address of a forwarding attachment unit located in a target network; transmitting information required for establishing an Internet Protocol (IP) tunnel with forwarding attachment unit to the data forwarding unit; and performing, when the vertical handover is initiated, an intra-network handover from a serving base station to the data forwarding unit.

In accordance with another exemplary embodiment of the present invention, a data forwarding apparatus located in a serving network for a vertical handover includes a user equipment controller which acquires an address of a forwarding attachment unit located in a target network and a data forwarding preparation request from a user equipment; an Internet Protocol (IP) tunnel controller which establishes an IP tunnel with the forwarding attachment unit using the address acquired by the user equipment controller; and a data forwarding controller which forwards, when the vertical handover is initiated, handover packets buffered in a serving base station to the forwarding attachment unit through the IP tunnel.

In accordance with another exemplary embodiment of the present invention, a forwarding attachment device located in a target network for a vertical handover includes an Internet Protocol (IP) tunnel controller which establishes, when an IP tunnel establishment request is received from a data forwarding unit located in a serving network; and a data forwarding controller which receives, when the vertical handover is initiated, handover packets forwarded by the data forwarding unit and forwards the received handover packets to a target base station.

In accordance with still another exemplary embodiment of the present invention, a user equipment for a vertical handover from a serving network to a heterogeneous target network includes a forward attachment function (FAF) acquisition unit for acquiring an address of a forward attachment unit located in the target network; a data forwarding function (DFF) acquisition unit for acquiring an address of a data forwarding unit located in the serving network; a DFF signaling controller for controlling transmission of information required for establishing an Internet Protocol (IP) tunnel between the data forwarding unit and the forward attachment unit to the data forwarding unit and controlling, when the vertical handover is initiated, an intra-network handover from a serving base station to the data forwarding unit; and an FAF signaling controller for controlling, after being connected to the target network, transmission of handover packets from the data forwarding unit to a target base station.

Advantageous Effects of Invention

The data forwarding method and system for a vertical handover according to the present invention allows the Data Forwarding Function located in the serving network establishes an IP tunnel with the Forward Attachment Function located in the target network and forwards the data destined to the UE to the Forward Attachment Function, when the Data Forwarding Function receives the handover request from the UE, thereby minimizing data loss during the vertical handover with the least change of network architecture as possible as it can.

BRIEF DESCRIPTION OF DRAWINGS

The above and other objects, features and advantages of the present invention will be more apparent from the following detailed description in conjunction with the accompanying drawings, in which.

MODE FOR THE INVENTION

Exemplary embodiments of the present invention are described with reference to the accompanying drawings in detail. The same reference numbers are used throughout the drawings to refer to the same or like parts. Detailed descriptions of well-known functions and structures incorporated herein may be omitted to avoid obscuring the subject matter of the present invention.

Figure 1:
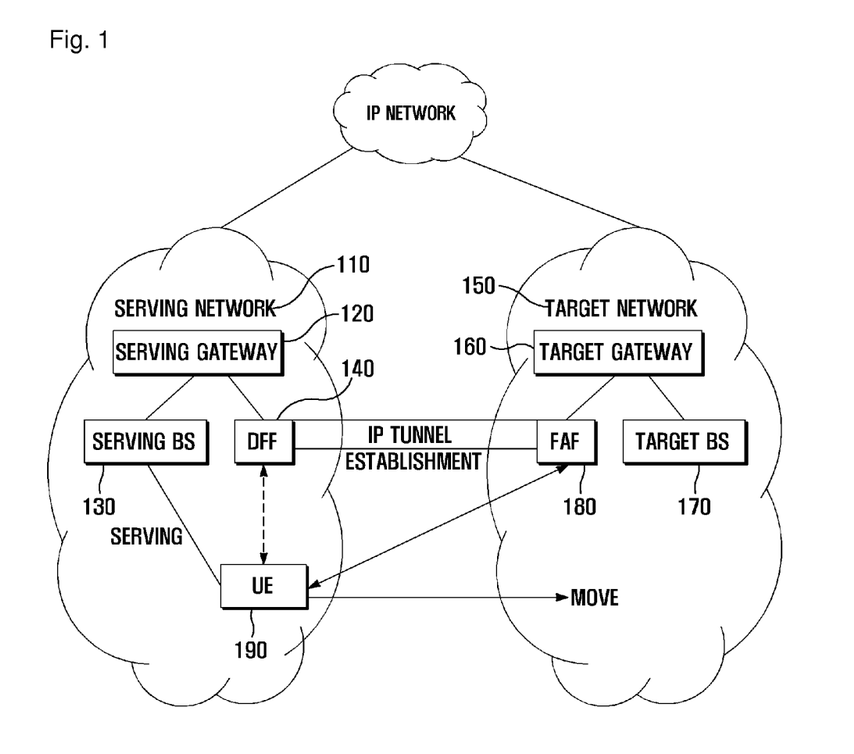
FIG. 1 is a schematic diagram illustrating a data forwarding system for vertical handover according to an exemplary embodiment of the present invention.

FIG. 1 is a schematic diagram illustrating a data forwarding system for vertical handover according to an exemplary embodiment of the present invention.

As shown in FIG. 1, the data forwarding system according to an exemplary embodiment of the present invention comprises a serving network 110 including a serving gateway 120, a serving base station 130, a Data Forwarding Function (DFF) 140; a target network 150 including a target gateway 160, a target base station 170, and a Forward Attachment Function (FAF) 180; and a mobile node 190.

The serving network 110 is the network currently serves the user equipment 190. In an exemplary embodiment of the present invention, the serving network 110 can be any of Worldwide Interoperability for Microwave Access (WiMAX) network, a 3G Long Term Evolution (3-LTE) network, and a $3^{rd}$ Generation Project Partnership (3GPP) network.

The serving gateway 120 is located within the serving network 110 and responsible for matching heterogeneous protocols of the heterogeneous networks.

The serving base station 130 is connected to the serving gateway 120 and serves the mobile terminal 190. When a vertical handover is triggered, the serving base station 130 forwards a handover packet to the DFF 140. If a vertical handover complete message is received from the user equipment 190, the serving base station 130 releases the connection with the user equipment 190.

The DFF 140 is recognized as a logical entity located in the serving network 110 but can be physically located in the IP network. Although, the DFF 140 is implemented as an independent network element in FIG. 1, it can be integrated into the serving gateway 110 as an access router of the serving network 110. The DFF 140, as a logical network entity, can be changed in location according to the network implementation plane and performs functions different from those of the conventional network elements.

During the handover execution for the User Equipment (UE) 190, the DFF 140 establishes an IP tunnel with the FAF 180 of the target network on the network layer and forwards the handover packet to the FAF 180. In this case, the DFF 140 acts as a base station, but it is just a logical unit for supporting the vertical handover. This means that the DFF 140 establishes an IP tunnel with the UE 190 and communicates with the UE 190 through the IP tunnel rather than through a radio channel.

The DFF 140 can have the same functionality of a WiMAX base station (hereinafter called WiMAX BS), a 3G-LTE base station (3G-LTE enhanced-Node B, herein after called (3G-LTE eNB), or a 3GPP bases station (hereinafter called 3GPP RNC/Node B) according to the type of the serving network 110.

The target network 150 is the network to which the UE 190 hands over from the serving network 110. In an exemplary embodiment of the present invention, the target network 150 can be any of Worldwide Interoperability for Microwave Access (WiMAX) network, a 3G Long Term Evolution (3-LTE) network, and a $3^{rd}$ Generation Project Partnership (3GPP) network.

The target gateway 160 is located in the target network 150 and responsible for conversion between heterogeneous protocols.

The target base station 170 is located in the target network 150 and connected to the target gateway 160. The target base station 170 is a base station to which the UE 190 performs the vertical handover. The target base station 170 receives the handover packet from the FAF 180 and completes the handover by delivering the packet to the UE 190.

The FAF 180 is recognized as a logical entity located in the target network 150 but can be physically located in the IP network. The FAF 180 is a base station-level entity which can communicate with the UE 190 directly. However, the FAF 180 is a logical entity for supporting the vertical handover. This means that communicates with the UE 190 through the IP tunnel.

The FAF 180 supports the pre-registration function to solve the authentication problem before the vertical handover between the heterogeneous networks. The pre-registration is a method in which the target network is detected while the UE is located in the serving network and performs authentication process with the target network at a time when the vertical handover to the target network is required before execution of the vertical handover. Although the UE completes the authentication process with the target network as a result of the pre-registration, this does not mean the handover to the target network. Since the authentication for the vertical handover is time-consuming process and the abnormal authentication process causes long latency, the pre-registration process is introduced to solve the problems caused by the authentication latency.

In an exemplary embodiment of the present invention, the FAF 180 supports the data routing function for delivering the handover packet forwarded by the DFF 140 to the target base station 170.

If the need of a vertical handover is detected while being served by the serving network 110, the UE 190 performs the pre-registration process with the FAF 180 located in the target network 150. In this case, the UE 190 acquires the IP address of the FAF 180 by using a DNS query. The UE 190 sends the acquired IP address of the FAF 180 to the DFF 140 along with a data forwarding request message and then requests the serving base station 130 for handover. At this time, the handover request is performed according to the conventional handover procedure in the serving network 110 but not vertical handover procedure. That is, the handover is performed from the source base station to the DFF 140 when the serving network 110 is a WiMAX network or the source RNC/Node B to the DFF 140 when the serving network 110 is a 3GPP network. As a consequence of the handover, the UE 190 is handed over from the serving base station 130 to the DFF 140 according to the conventional homogeneous handover procedure within the service network 110, and thus the data are forwarded to the DFF 140.

Using the conventional handover procedure, the handover is performed from the serving base station 130 to the DFF 140 without changing the network, and the serving base station forwards the data to the DFF 140. The DFF 140 establishes an IP tunnel with the FAF 180 on the network layer and forwards the handover packet received from the serving base station to the FAF through the IP tunnel.

As a consequence, the handover packets having the high packet loss probability are forwarded through the IP tunnel between the DFF 140 and FAF 180.

After the packet forwarding from the DFF 140 to the FAF 180 is successfully complete, the packet forwarding from the FAF 180 to the target base station 170 is performed according to the homogeneous handover within the same network.

Once the vertical handover is completed, the UE 190 releases the connection to the serving network 110 and performs deregistration process. The serving base station 130 can reallocate the released resource to another UE, resulting in efficient radio resource management.

Figure 2:
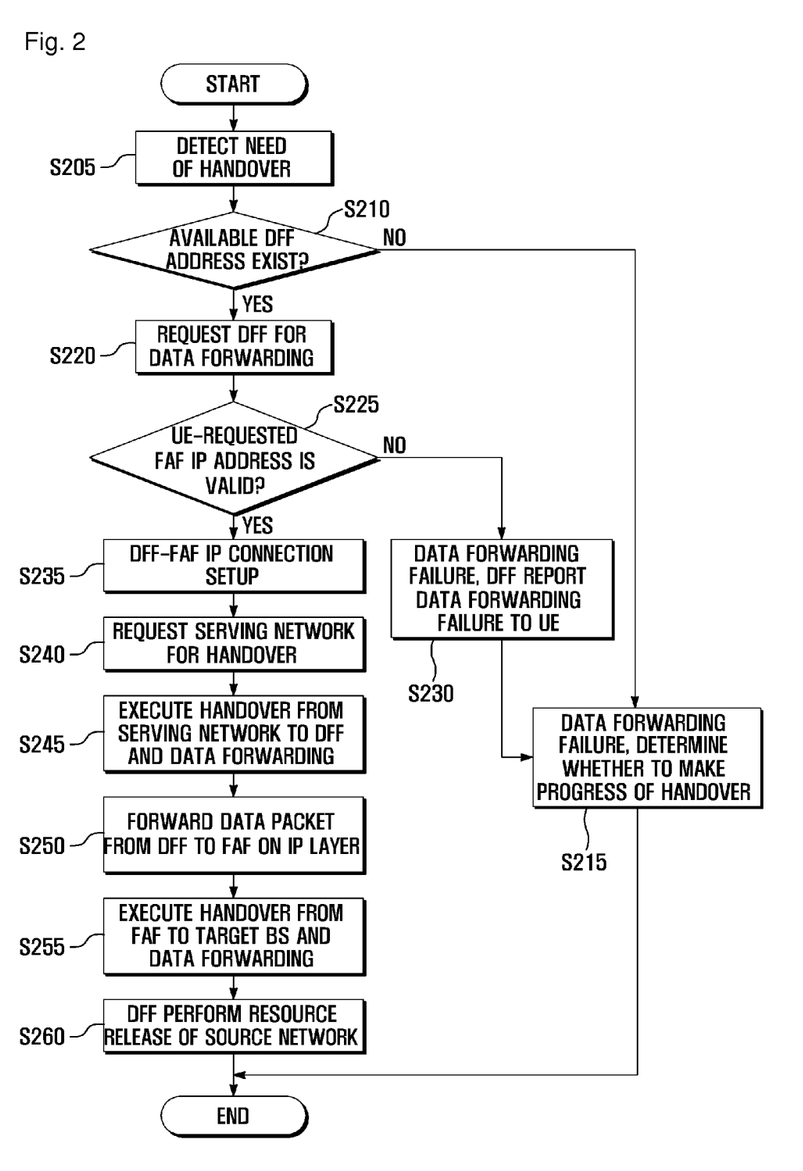
FIG. 2 is a flowchart illustrating a data forwarding method for a vertical handover according to an exemplary embodiment of the present invention.

FIG. 2 is a flowchart illustrating a data forwarding method for a vertical handover according to an exemplary embodiment of the present invention. In FIG. 2, the UE 190 requests the serving network 110 for data forwarding and vertical handover such that the handover packet is forwarded to the FAF 180 via the DFF 140 on IP layer.

The UE 190 first detects the need of a vertical handover (205). In an exemplary embodiment of the present invention, the UE 190 is configured to detect the need of a handover when the signal strength of the serving network 110 weakens and the target network 150 is detected.

Once it is determined to execute a vertical handover, the UE 190 determines whether an available DFF exists (210). If no available DFF exists, this means that the data forwarding is impossible. In this case, the UE 190 determines not to make the progress of the handover (215).

Otherwise, if an available DFF 140 exists, the UE 190 requests the DFF 140 for data forwarding by sending a data forwarding request message (220). Table 1 shows an exemplary format of the data forwarding request message.

TABLE 1

| Syntax | Size | Notes |
|---|---|---|
| Data forwarding request message format ( ) { | — | — |
| DFF interface type | 4 bits | 0000: reserved<br>0001: first network<br>0010: second network<br>0100: third network<br>1111: reserved |
| Management message type | — | Message type size depends on network |
| UE/MS ID | — | — |
| Target network address type (FAF) | 2 bits | 00: IPv6<br>01: reserved<br>10: reserved<br>11: IPv4 |
| Target network router (FAF) address | Variable | — |
| } | — | — |
| Padding | variable | — |
| } | — | — |

The data forwarding request message transmitted to the DFF 140 through the IP tunnel established between the UE 190 and the DFF 140. The data forwarding request message is used to instruct the FAF 140 and FAF 180 to prepare data forwarding. The data forwarding request message includes a network interface type field informing of the interface type for the target network, message type field informing of the available message type for the interface, and device UE ID field. The data forwarding message also includes the IP address of the FAF 180 and IP version for informing the DFF 140 of the initiation time of the data forwarding and destination of the forwarded data.

If the data forwarding request message is received, the DFF 140 determines whether the IP address of the FAF 180 contained in the data forwarding request message is available (225).

If the IP address of the FAF 180 is invalid, this means data fording failure and thus the DFF 140 sends a data forwarding response message indicative of data forwarding failure to the UE 190 (230).

Table 2 shows an exemplary format of the data forwarding response message.

TABLE 2

| Syntax | Size | Notes |
|---|---|---|
| Data forwarding response message format ( ) { | — | — |
| Data forwarding setup success/failure indicator | — | 0: success 1: failure |
| Failure case { | — | — |
| Failure type | 8 bits | TCP/IP error code |
| } | | |
| Padding | — | — |
| } | — | — |

The data forwarding response message is sent from the DFF 140 to the UE 190 through the IP tunnel established between the UE 190 and the DFF 140. The data forwarding response message is used for reporting the result of the data forwarding setup between the DFF 140 and the FAF 180. For this purpose, the data forwarding response message includes the data forwarding setup success/failure indicator. If the data forwarding setup fails, the data forwarding setup success/failure indicator is set with a TCP/IP error code such that the UE 190 determines whether to make the progress of the handover based on the data forwarding setup success/failure indicator.

Otherwise, if the data forwarding setup succeeds, the DFF 140 establishes an IP tunnel with the FAF 180 on the network layer (235). Once the IP tunnel is established between the DFF 140 and the FAF 180, the UE 190 requests the serving network 110 for a handover (240). If a handover request is received, the serving network 110 performs the handover and data forwarding from the serving base station 130 to the DFF 140 (245).

Sequentially, the DFF 140 forwards the handover packet received from the serving base station 130 to the FAF 180 through the IP tunnel (250). The FAF 180 received the handover packet performs a handover and data forwarding to the target base station 170 (255).

Finally, the DFF 140 performs a resource release function such that the resource allocated to for communication between the UE 190 and the serving base station 130 is released (260).

The data forwarding method and system for the vertical handover is described with reference to the first and third exemplary embodiments of the present invention.

The first embodiment is described with an exemplary vertical handover from a WiMAX network as the serving network to a 3GPP network as the target network. The second embodiment is described with an exemplary vertical handover from a 3GPP network as the serving network to a WiMAX network as the target network. Finally, the third embodiment is described with an exemplary vertical handover from a 3G-LTE network as the serving network to a WiMAX network as the target network.

First Embodiment

Figure 3:
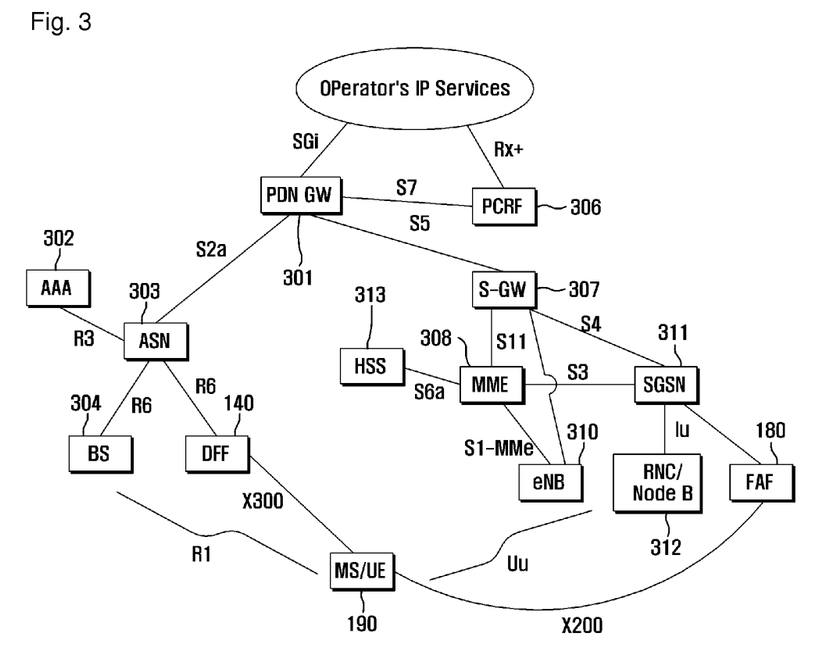
FIG. 3 is a diagram illustrating network architecture for supporting the vertical handover from a WiMAX access network and 3GPP access network according to the first embodiment of the present invention.

FIG. 3 is a diagram illustrating network architecture for supporting the vertical handover from a WiMAX access network and 3GPP access network according to the first embodiment of the present invention.

In FIG. 3, the WiMAX network as the serving network 110 includes an Authentication, Authorization, and Accounting (AAA) server 302, an Access Service Network Gateway (ASN GW) 303, and a Base Station (BS) 304. Since the serving network 110 is the WiMAX network, the DFF 140 is implemented as a WiMAX BS-level network entity. The 3GPP UMTS Terrestrial Radio Access Network (UTRAN) as the target network 150 includes a Serving GPRS Support Node (SGSN) 311 and a Radio Network Controller/Node B (RNC/Node B) 312. Since the target network 150 is a 3GPP UTRAN, the FAF 180 is implemented as a RNC/Node B-level network entity.

The UE 190 connects to the DFF 140 via an X300 interface and to the FAF 180 via an X200 interface.

Figure 4:
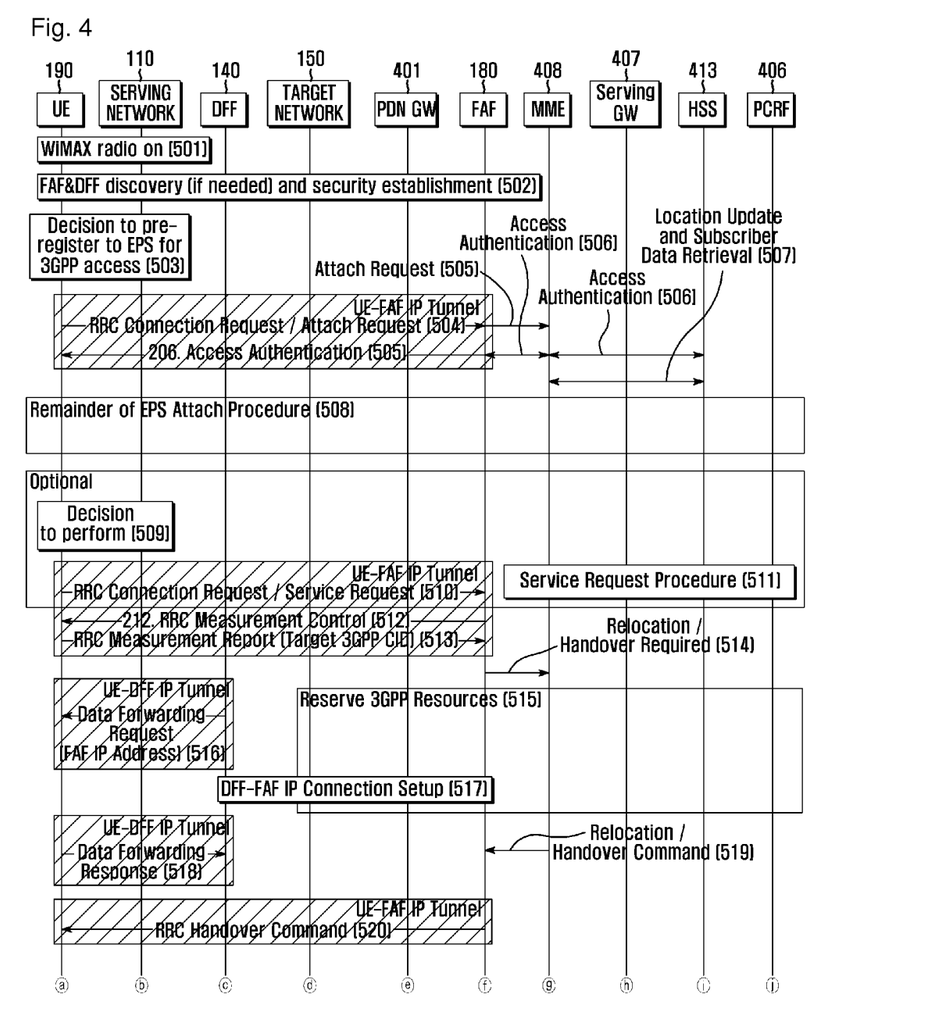
FIGS. 4 and 5 are sequence diagrams illustrating operations of network entities constituting the network architecture of FIG. 3 for forwarding data from the serving network to the target network in vertical handover according to the first embodiment of the present invention.
Figure 5:
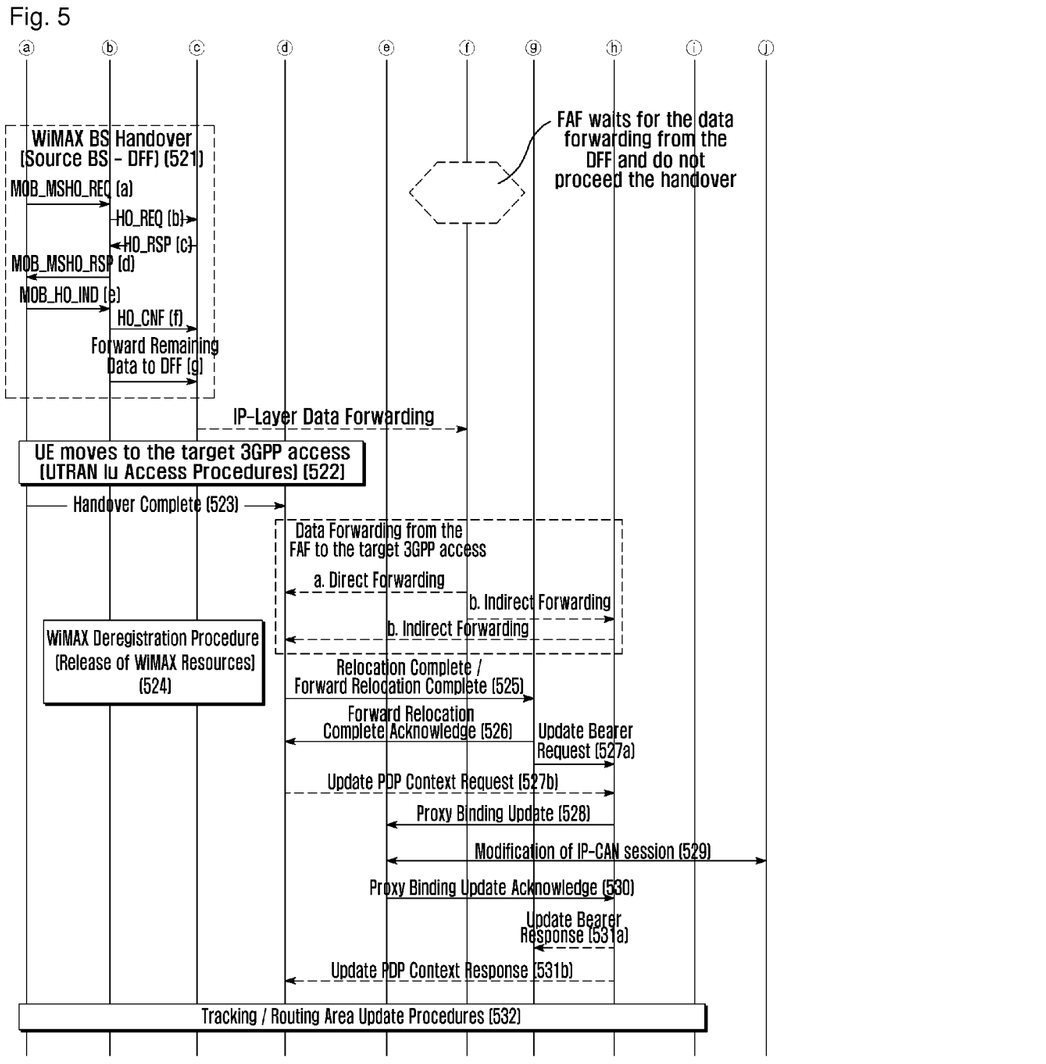

FIGS. 4 and 5 are sequence diagrams illustrating operations of network entities constituting the network architecture of FIG. 3 for forwarding data from the serving network to the target network in vertical handover according to the first embodiment of the present invention.

In the first embodiment of the present invention, a handover preparation phase is composed of the processes denoted by reference numerals 501 to 508 for the pre-registration to facilitate the vertical handover. The pre-registration procedure follows the procedure specified in the conventional WiMAX-3GPP optimized handover.

In FIGS. 4 and 5, the UE 190 switches on the WiMAX radio to connect to the WiMAX network as the serving network 110 (501). While served by the serving network 110, the UE 190 acquires the IP addresses of the FAF 180, the DFF 140, and the WiMAX BS 404 by using a DNS query as the first step of the pre-registration procedure (502).

Here, the IP address of the FAF 180 is used for establishing an IP tunnel between the UE 190 and the FAF 180 to initiate the pre-registration procedure and forwarding the handover packet on the network layer (i.e. IP layer) between the DFF 140 and the FAF 180.

Also, the IP address of the DFF 140 is used for establishing an IP tunnel between the UE 190 and the DFF 140 to request the DFF 140 for data forwarding and transmit the IP address of the FAF 180.

After acquiring the IP addresses of these network entities, the UE 190 determines whether to make the progress of the pre-registration process with the 3GPP access network (503). If it is determined to make the progress of the pre-registration process, the UE 190 transmits an RRC Connection Request/Attach Request message to the FAF 180 through the IP tunnel established between the UE 190 and the FAF 180 so as to initiate E-UTRAN initial attachment procedure (504). Upon receipt of the RRC Connection Request/Attach Request message, the FAF 180 forwards the Attach Request message to the Mobility Management Entity (MME) 408 (505). Next, the UE 190 performs an access authentication process with an Evolved Packet System (EPS) for authentication to the Home Subscriber Server (HSS) 507. Next, the MME 408 updates the location information and retrieves the subscriber data by exchanging messages with the HSS 413 (507). Next, the UE 190 performs the EPS attachment procedure according to the E-UTRAN initial attach procedure specified in the standard specification document (508). Through steps 501 to 508, the UE 190 completes the pre-registration procedure with the target network 150.

The UE 190 decides the vertical handover from the WiMAX access network to the 3GPP access network (509).

If the vertical handover is not initiated right after the completion of the pre-registration procedure, the EPS including the FAF 180 determines that the UE 190 is in idle mode state. Accordingly, in order to recover the connection to the EPS, the UE 190 sends an RRC Connection Request/Service Request message to the EPS at step 509. Upon receipt of the RRC Connection Request/Service Request message, the EPS including FAF 180 activate the connection state of the UE 190 through a Service Request Procedure (511). Once the Service Request Procedure is complete (510 and 511) or the UE 190 initiates the vertical handover right after the pre-registration procedure, the FAF 180 sends the UE 190 an RRC Measurement Control message to request for measurement report (512). In response to the RRC Measurement Control message, the UE 190 sends the FAF 180 an RRC Measure Report containing the CID of the target network 150 (513). Through the optional procedure composed of steps 510 to 511, the connection between the UE 190 and the EPS is activated for the handover to the target network 150.

After the connection between the UE 190 and the EPS including the FAF 180 is activated, the FAF 180 performs the handover procedure to the 3GPP access network as the target network 150.

The FAF 180 sends a handover request message to the MME 408 (514). Upon receipt of the handover request message, the MME 408 controls such that the 3GPP resources for the handover to the 3GPP access network as the target network 150 are reserved through the handover preparation procedure between the E-UTRAN and the UTRAN (515).

While the FAF 180 is preparing the handover to the 3GPP access network, the UE 190 establishes an IP tunnel with the DFF 140 using the IP address of the DFF 140 that is acquired after the connection to the FAF 180 at step 502. Afterward, the UE 190 sends a data forwarding request message to the DFF 180 in order for the DFF 180 to prepare data forwarding (516). The data forwarding request message informs the DFF 140 of the time to initiate data forwarding to the FAF 180 such that the DFF 140 can forward the handover packet received from the service base station 407 to the FAF 180 immediately. The data forwarding request message includes the IP address of the FAF 180 used in the pre-registration procedure such that the DFF 140 can perform the IP connection setup with the FAF 180 (517). After the IP connection setup, the DFF 140 sends the UE 190 a data forwarding response message including the IP connection setup result in response to the data forwarding request message (518). If the IP connection setup has been successfully established between the DFF 140 and the FAF 180, this means that the data forwarding is prepared, and thus the UE 190 makes the progress of the handover. If the IP connection setup has been failed between the DFF 140 and the FAF 180, the UE 190 checks the error code contained in the data forwarding response message and determines whether to make the progress of the handover. Since the handover cannot be performed only with the data forwarding, the UE 190 determines whether to make the progress of handover based on the messages received from the EPS with the data forwarding failure status.

After the completion of the resource reservation procedure for the handover to the target network 150, the MME 408 sends the FAF 180 a relocation/handover command message (519). Upon receipt of the relocation/handover command message, the MME 408 sends the UE 190 an RRC Handover Command message to inform of the completion of the 3GPP resource reservation and instruct to make the progress of the handover to the target network 150 (520).

After receiving the Relocation/Handover Command message, the FAF 180 should make the progress of the handover by transmitting the buffered handover packets to the RNC/Node B. However, since the DFF 140 does not start data forwarding yet, the FAF 180 holds the progress of the handover while waiting for the data forwarding from the DFF 140.

Upon receipt of the RRC Handover Command at step 520, the UE 190 sends the WiMAX BS as the serving BS a handover request (MOB_MSHO_REQ) message to request for the handover to the DFF 140 in the WiMAX access network (521). In this case, since the DFF 140 is a WiMAX BS-level network entity supporting the WiMAX BS functions and connected to the same ASN GW (not shown), the handover between the WiMAX BS and the DFF 140 follows the conventional inter-WiMAX BSs handover procedure.

Upon receipt of the MOB_MSHO_REQ message, the serving network 110 makes the handover with the DFF 140 by exchanging the handover messages (transmitting HO_REQ message and receiving HO_RSP message). During this intra-WiMAX BSs handover, the handover packets buffered in the serving base station is forwarded to the DFF 140 such that the DFF 140 forwards the handover packets received from the serving base station to the FAF 180 through the IP tunnel.

Once the handover has completed, the UE 190 releases the connection to the serving network 110 and establishes a connection to the 3GPP access network as the target network 150 (522). After the connection is handed over, the UE 190 sends a Handover Complete message to the target network 150 to inform of the connection to the 3GPP access network (523). Since the EPS including the FAF 180 is in the middle of the intra-network handover, the FAF 180 forwards the handover packets received from the DFF 140 to the RNC/Node B as the target network. At this time, the data forwarding can be performed using a direct forwarding or an indirect forwarding via the serving gateway 407, depending on the connection method.

After the completion of the data forwarding, it is not required to maintain the connection to the DFF 140 such that the DFF starts a serving network deregistration procedure (524). During the serving network deregistration procedure, the resource allocated to the UE 190 is withdrawn for reuse.

Upon receipt of the Handover Complete message, the 3GPP access network as the target network 150 recognizes the entry of the UE 190 within its service coverage. The 3GPP access network changes the data path to the UE 190 from the FAF 180 to the 3GPP access network 150. The 3GPP access network 150 sends the FAF 180 a Relocation Complete/Forward Relocation Complete message (525), and the FAF 180 sends the 3GPP access network 150 a Forward Relocation Complete Acknowledgement message in response to the Relocation Complete/Forward Relocation Complete message and changes the attachment point of the UE 190 from the FAF 180 to the 3GPP access network 150 (526).

In order to change the data path from the PDN GW 401 to the UE 190, the 3GPP access network 150 sends the serving gateway 407 an Update PDP Context Request message (527). Upon receipt of the Update PDP Context Request message, the Serving gateway 407 sends the PDN GW 401 as a Home Agent (HA) a Proxy Binding Update (PBU) message (528). Upon receipt of the Proxy Binding Update message, the PDN GW 401 modifies the IP-CAN session with the PCRF 406 (529) and then sends the serving gateway 407 a Proxy Binding Update Acknowledgement message in response to the Proxy Binding Update message (530). Next, the serving gateway 407 sends the 3GPP access network 150 an Update PDP Context Response message to inform of the registration with the PDN GW 401 and the establishment of the data path (531). Next, the UE 190 performs a 3GPP Tracking Area Update (TAU) and Routing Area Update (RAU) procedures (532) and completes the vertical handover including data forwarding.

Second Embodiment

Figure 6:
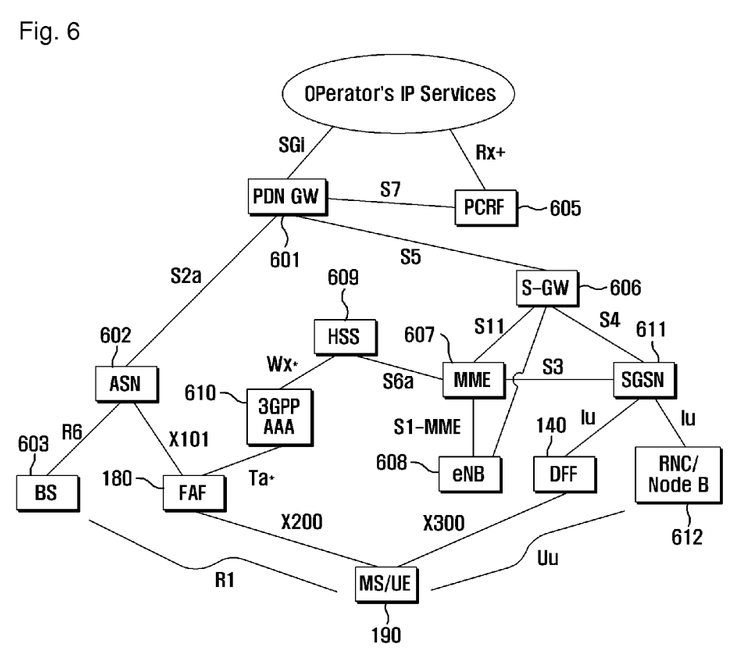
FIG. 6 is a diagram illustrating network architecture for supporting the vertical handover from a 3GPP access network to a WiMAX access network according to the second embodiment of the present invention.

FIG. 6 is a diagram illustrating network architecture for supporting the vertical handover from a 3GPP access network to a WiMAX access network according according to the second embodiment of the present invention.

The 3GPP UTRAN as the serving network 110 includes an SGSN 611 and an RNC/Node B 612. The DFF 140 located in the serving network 110 is an RNC/Node B-level network entity so as to support the functions of the RNC/Node B.

The WiMAX access network as the target network 150 includes an ASN GW 602 and a WiMAX BS 603. The FAF 180 located in the target network 150 is a WiMAX BS-level network entity so as to support the functions of the WiMAX BS.

Figure 7:
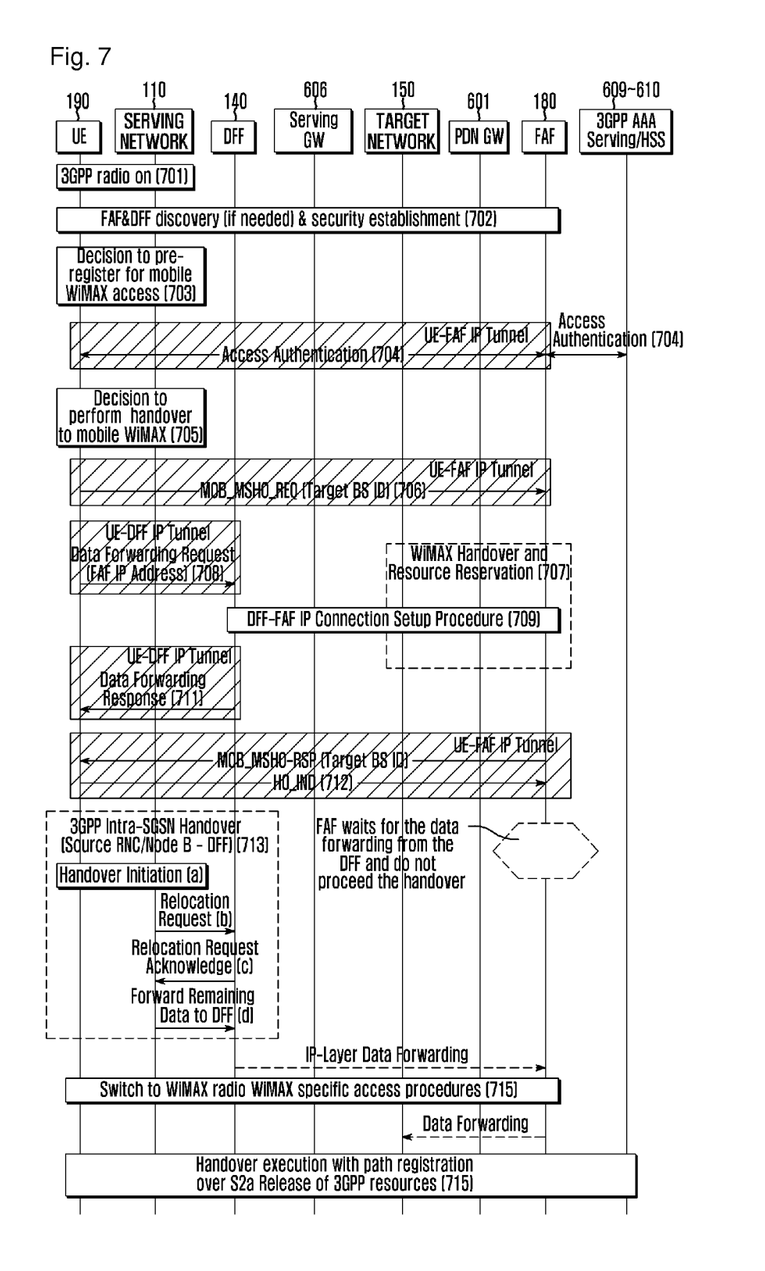
FIG. 7 is a sequence diagram illustrating operations of network entities constituting the network architecture of FIG. 6 for forwarding data from the serving network to the target network in vertical handover according to the second embodiment of the present invention.

FIG. 7 is a sequence diagram illustrating operations of network entities constituting the network architecture of FIG. 6 for forwarding data from the serving network to the target network in vertical handover according to the second embodiment of the present invention.

In the second embodiment of the present invention, a handover preparation phase is composed of the processes denoted by reference numerals 701 to 704 for pre-registration to facilitate the vertical handover. The pre-registration procedure follows the procedure specified in the conventional WiMAX-3GPP optimized handover.

Referring to FIG. 7, the UE 190 switches on the 3GPP radio to connect to the 3GPP access network (701). While served by the 3GPP access network as the serving network 110, the UE 190 acquires the IP addresses of the FAF 180, the DFF 140, and the WiMAX BS 404 by using a DNS query as the first step of the pre-registration procedure (702).

Here, the IP address of the FAF 180 is used for establishing an IP tunnel between the UE 190 and the FAF 180 to perform the pre-registration procedure and forwarding the handover packets on the network layer (i.e. IP layer) between the DFF 140 and the FAF 180.

Also, the IP address of the DFF 140 is used for establishing an IP tunnel between the UE 190 and the DFF 140 to request the DFF 140 for data forwarding and transmit the IP address of the FAF 180.

After acquiring the IP addresses of theses network entities, the UE 190 determines whether to makes a progress of the pre-registration process with the WiMAX access network (703). If it is determined to make the progress of the pre-registration process, the UE 190 performs an Access Authentication procedure with the WiMAX access network as the target network 150 and the 3GPP AAA server/HSS 609 and 610 (704) to facilitate the vertical handover to be formed afterward. Through steps 701 to 704, the UE 190 completes the pre-registration with the target network 150.

After the completion of the pre-registration with the target network 150, the UE 190 decides a vertical handover to the WiMAX access network (705). At this time, the UE 190 is maintaining the connection with the FAF 180 operating at the same level as the WiMAX BS. The UE 190 sends the FAF 180 a MOB_MSHO_REQ message to request for the handover to the target base station (706). Upon receipt of the MOB_MSHO_REQ message, the FAF 180 performs a WiMAX handover and Resource Reservation procedure with the target network 150 (707).

At this time, the UE 190 establishes an IP tunnel to the DFF 140 on the network layer using the IP address of the DFF 140 and sends the DFF 140 a Data Forwarding Request message to request the DFF 140 for preparation of data forwarding to the FAF 180 (708). The Data Forwarding Request message informs the DFF 140 of the initiation time of the data forwarding to the FAF 180 and instructs to DFF 140 to prepare the data forwarding so as to transmit the handover packets received from the RNC/Node B as the serving base station to the FAF 180 immediately. The Data Forwarding Request message includes the IP address of the FAF 180 used in the pre-registration procedure. Upon receipt of the Data Forwarding Request message, the DFF 140 performs the IP Connection Setup Procedure with the FAF 180 (709) and sends the UE 190 a Data Forwarding Response message containing the connection setup result in response to the Data Forwarding Request message (711).

In case that the data connection setup is established successfully between the DFF 140 and the FAF 180, the UE 190 determines that the data forwarding is prepared, and makes the progress of the handover procedure. In contrast, if the data connection setup is failed between the DFF 140 and the FAF 180, the UE 190 checks the error code contained in the Data Forwarding Response message and determines whether to makes the progress of the handover procedure. Since the handover cannot be performed only with the data forwarding, the UE 190 determines whether to make the progress of the handover based on the messages received from the WiMAX access network as the target network 150 in consideration of the data forwarding failure status.

In the meantime, if the Resource Reservation procedure is completed between the FAF 180 and the target network 150 at step 707, the FAF 180 sends the UE 190 a MOB_M-SHO_RSP message informing of the preparation for the handover in the WiMAX access network. At the same time, the FAF 180 instructs the handover to the target base station. Upon receipt of the MOB_MSHO_RSP message, the UE 190 sends the FAF 180 a HO_IND message to inform of the initiation of the handover to the target base station.

Once the HO_IND message is received, the FAF 180 should make the progress of the handover by transmitting the buffered handover packets to the target base station. However, since the DFF 140 does not start data forwarding yet, the FAF 180 holds the progress of the handover while waiting for the data forwarding from the DFF 140.

After transmitting the HO_IND message, the UE 190 initiates a 3GPP intra-SGSN handover from RNC/Node B to the DFF 140 in the 3GPP access network (713). Since the DFF 140 is a 3GPP RNC/Node B-level network entity supporting the functions of the 3GPP RNC/Node B and connected to the same SGSN 611, the handover between the source RNC/Node B and the DFF 140 follows the conventional 3GPP Intra-SGSN handover procedure. During this handover procedure, the handover packets destined to the UE 190 and buffered in the source RNC/Node B are forwarded to the DFF 140, and the DFF 140 forwards the handover packets received from the source RNC/Node B to the FAF 180 through the IP tunnel on the network layer immediately.

Once the intra-SGSN handover has completed in the serving network 110, the UE 190 disconnects to the serving network 110 and switches the connection to the WiMAX access network as the target network 150 (714). The FAF 180 performs the handover to the WiMAX BS and forwards the handover packets received from the DFF 140 to the WiMAX BS.

At step 715, the path registration procedure is executed through the S2a interface between the ASN GW 602 and the PDN GW 601. Once the data forwarding to the FAF 180 has completed, there is no need to maintain the connection between the UE 190 and the DFF 140, such that the DFF 140 performs a 3GPP UTRAN detach procedure (715). Accordingly, the resource allocated to the UE 190 in the 3GPP access network as the serving network 110 is withdrawn for reuse. Through steps 701 to 715, the vertical handover including data forwarding is completed.

Third Embodiment

Figure 8:
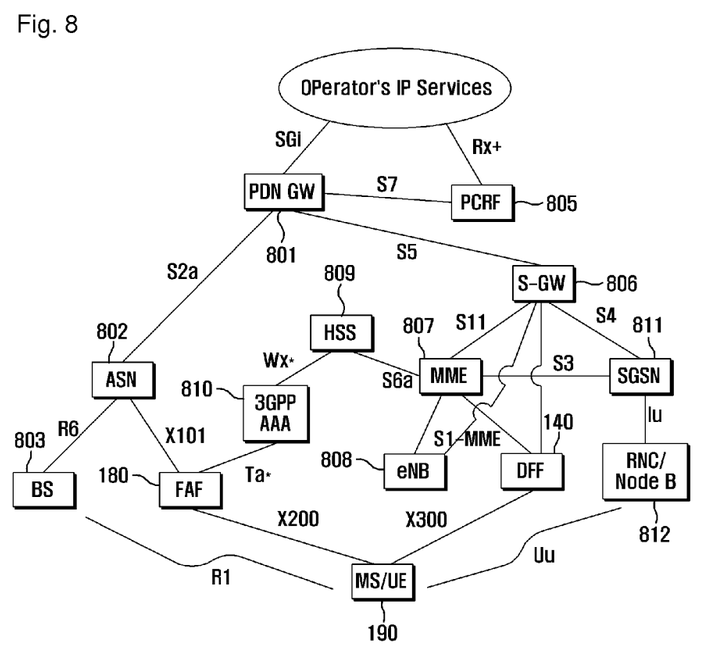
FIG. 8 is a diagram illustrating network architecture for supporting the vertical handover from a 3G-LTE access network to a WiMAX access network according to the third embodiment of the present invention.

FIG. 8 is a diagram illustrating network architecture for supporting the vertical handover from a 3G-LTE access network according to the third embodiment of the present invention.

The 3G-LTE EPS network as the serving network 110 includes a PDN GW 801, a Policy Charging Rule Function (PCRF) 806, a serving gateway 807, a Mobility Management Entity (MME) 808, a 3G-LTE eNB 810, and a Home Subscriber Server (HSS) 813.

The WiMAX access network as the target network 150 includes an ASN GW 602 and a WiMAX BS 603. The FAF 180 located in the target network 150 is a WiMAX BS-level network entity so as to support the functions of the WiMAX BS.

Figure 9:
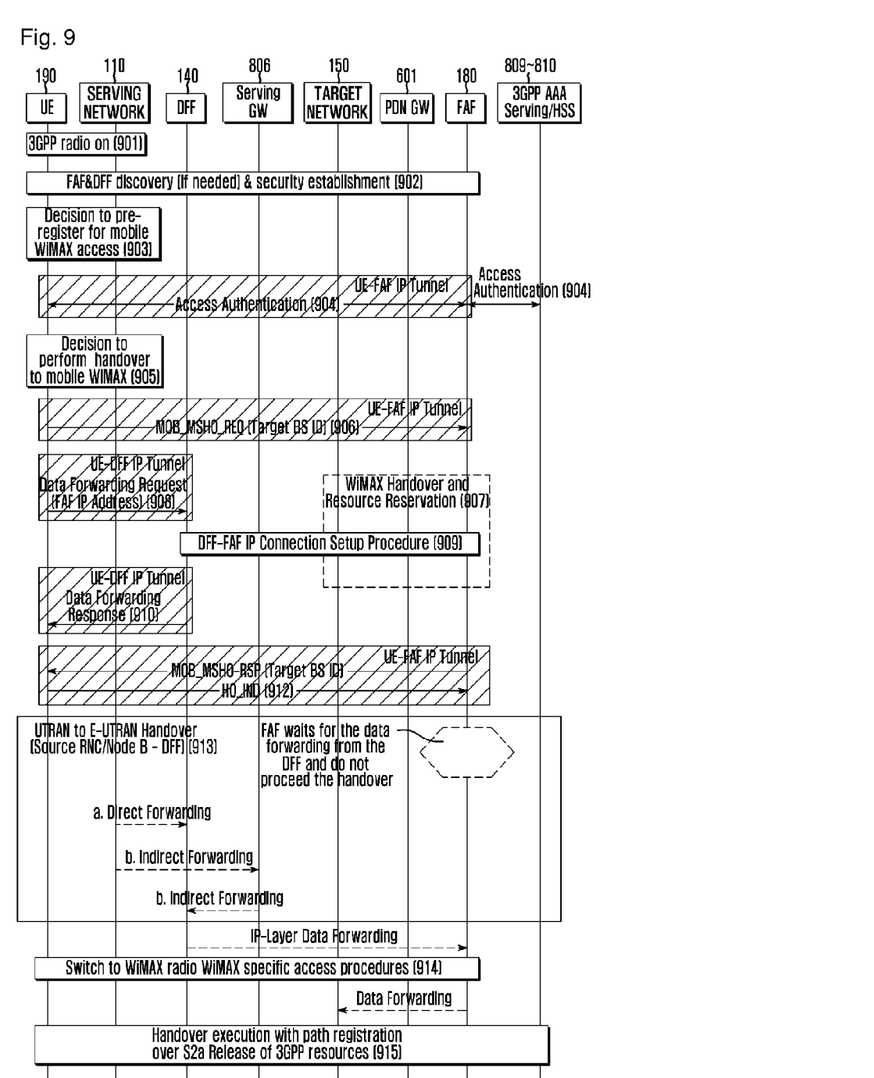
FIG. 9 is a sequence diagram illustrating operations of network entities constituting the network architecture of FIG. 8 for forwarding data from the serving network to the target network in vertical handover according to the third embodiment of the present invention.

FIG. 9 is a sequence diagram illustrating operations of network entities constituting the network architecture of FIG. 8 for forwarding data from the serving network to the target network in vertical handover according to the third embodiment of the present invention.

The third embodiment differs from the second embodiment in that the DFF 140 is a 3G-LTE eNB-level entity other than 3GPP RNC/Node B-level entity. Accordingly, the handover procedure at step 913 is performed between the UTRAN and E-UTRAN but not the 3GPP intra-SGSN handover.

In the third embodiment of the present invention, a handover preparation phase is composed of the processes denoted by reference numerals 901 to 904 for pre-registration to facilitate the vertical handover. The pre-registration procedure follows the procedure specified in the conventional WiMAX-3GPP optimized handover.

Referring to FIG. 9, the UE 190 switches on the 3GPP radio to connect to the 3GPP access network (901). While served by the 3GPP access network as the serving network 110, the UE 190 acquires the IP addresses of the FAF 180, the DFF 140, and the 3G-LTE eNB by using a DNS query as the first step of the pre-registration procedure (902).

Next, the UE 190 determines whether to makes a progress of the pre-registration process with the WiMAX access network (903). If it is determined to make the progress of the pre-registration process, the UE 190 performs an Access Authentication procedure with the WiMAX access network as the target network 150 (904). Through steps 901 to 904, the UE 190 completes the pre-registration with the target network 150.

After the completion of the pre-registration with the target network 150 the UE 190 decides a vertical handover to the WiMAX access network (905). At this time, the UE is maintaining the connection with the FAF 190 operating at the same level as the WiMAX BS. The UE 190 sends the FAF 180 a MOB_MS_REQ message to request for the handover to the target base station (906). Upon receipt of the MOB_MSHO_REQ message, the FAF 180 performs a WiMAX handover and Resource Reservation procedure with the target network 150 (907).

At this time, the UE 190 establishes an IP tunnel to the DFF on the network layer using the IP address of the DFF 140 and sends the DFF 140 a Data Forwarding Request message to request the DFF 140 for preparation of data forwarding to the FAF 180 (908). The Data Forwarding Request message informs the DFF 1140 of the initiation time of the data forwarding to the FAF 180 and instructs the DFF 140 to prepare the data forwarding so as to transmit the handover packets received from the 3G-LTE eNB as the serving base station to the FAF 180 immediately. The Data Forwarding Request message includes the IP address of the FAF 180 used in the pre-registration procedure. Upon reception of the Data Forwarding Request message, the DFF 140 performs the IP Connection Setup Procedure with the FAF 180 (909) and sends the UE 190 a Data Forwarding Response message containing the connection setup result in response to the Data Forwarding Request message (911).

In case that the data connection setup is established successfully between the DFF 140 and the FAF 180, the UE 190 determines that the data forwarding is prepared, and makes the progress of the handover procedure. Otherwise, if the data connection setup is failed between the DFF 140 and the FAF 180, the UE 190 checks the error code contained in the Data Forwarding Response message and determines whether to make the progress of the handover procedure.

Since the handover cannot be performed only with the data forwarding, the UE 190 determines whether to make the progress of the handover based on the message received from the WiMAX access network as the target network 150 in consideration of the data forwarding failure status.

In the meantime, if the Resource Reservation procedure is completed between the FAF 180 and the target network 150 at step 907, the FAF 180 sends the UE 190 a MOB_MSHO_RSP message information of the preparation for the handover in the WiMAX access network. At the same time, the FAF 180 instructs the handover to the target base station. Upon receipt of the MOB_MSHO_RSP message, the UE 190 sends the FAF 180 a HO_IND message to inform of the initiation f the handover to the target base station. Once the HO_IND message is received, the FAF 180 should make the progress of the handover by transmitting the buffered handover packets to the target base station. However, since the DFF 140 does not start data forwarding yet, the FAF 180 holds the progress of the handover while waiting for the data forward from the DFF 140.

After transmitting the HO_IND message, the UE 190 initiates a handover from the source RNC/node be to the DFF 140 (913). Since the DFF 140 is a 3G-LTE eNB-level network entity supporting the functions of the 3G-LTE eNB functions, the handover between the 3G-LTE eNB and the DFF 140 follows the conventional handover procedure between the UTRAN and the E-UTRAN. During this handover procedure, the handover packets destined to the UE 190 and buffered in the 3G-lte eNB are forwarded to the DFF 140, and the DFF 140 forwards the handover packets received from the 3G-LTE eNB to the FAF 180 through the IP tunnel on the network layer immediately.

Once the handover between the UTRAN and the E-UTRAN in the 3G-LTE access network, the UE 190 disconnects to the serving network 100 and switches the connection to the WiMAX access network as the target network 150 (914). The FAF 180 performs the handover to the WiMAX BS and forwards the handover packets received from the DFF 140 to the WiMAX BS.

At step 915, the path registration procedure is executed through the S2a interface between the ASN GW and the PDN GW 601. After completion of the data forwarding to the FAF 180, it is not need to maintain the connection between the DFF 140 and the UE 190, whereby the DFF 140 performs the 3GPP UTRAN detach procedure (915). Accordingly, the resource allocated to the UE 190 in the 3G-LTE access network is withdrawn by the 3G-LTE UTRAN for reuse. Through steps 901 to 915, the vertical handover including data forwarding is completed.

Figure 10:
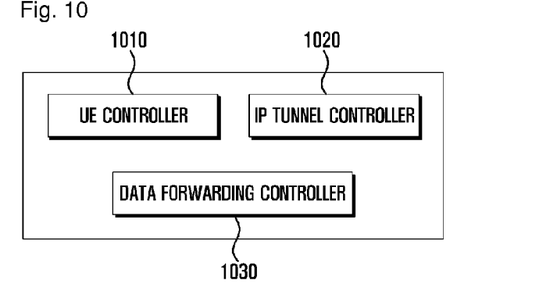
FIG. 10 is a block diagram illustrating a configuration of a DFF for supporting the data forwarding in vertical handover according to an exemplary embodiment of the present invention.

FIG. 10 is a block diagram illustrating a configuration of a DFF for supporting the data forwarding in vertical handover according to an exemplary embodiment of the present invention. As shown in FIG. 10, the DFF includes a UE controller 1010, an IP tunnel controller 1020, and a data forwarding controller 1030.

The UE controller 1010 is responsible for signaling related to the authentication procedure for the UE 190 and request and response messages related to the data forwarding. Particularly, the UE controller 1010 receives the FAF s IP address transmitted by the UE 190 and transfers the FAF s IP address to the IP tunnel controller 1020. The UE controller 1010 also receives the data forwarding request transmitted by the UE 190 and transfers the data forwarding request to the forwarding controller 1030.

The IP tunnel controller 1020 establishes an IP tunnel with the corresponding FAF 180 using the FAF s IP address received from the UE 190.

The data forwarding controller 1030 controls such that the handover packets buffered in the serving base station are forwarded through the IP tunnel established with the FAF 180 in the vertical handover procedure. In an exemplary embodiment of the present invention, the handover packets are forwarded to the target network as described above, thereby avoiding data loss during the vertical handover.

Figure 11:
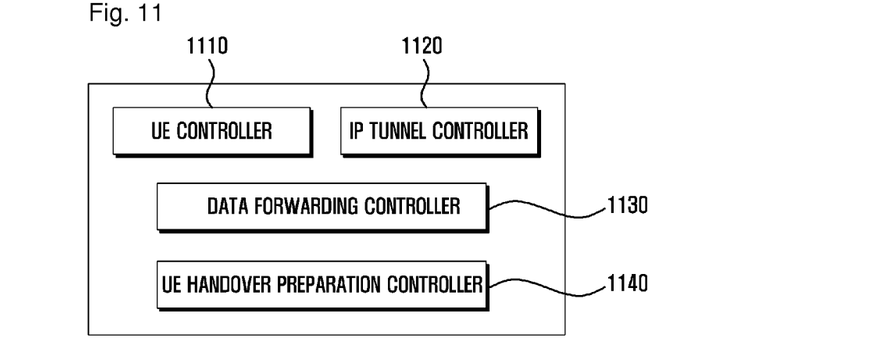
FIG. 11 is a block diagram illustrating a configuration of an FAF for supporting the data forwarding in vertical handover according to an exemplary embodiment of the present invention.

FIG. 11 is a block diagram illustrating a configuration of an FAF for supporting the data forwarding in vertical handover according to an exemplary embodiment of the present invention. As shown in FIG. 11, the FAF includes a UE controller 1110, an IP tunnel controller 1120, a data forwarding controller 1130, and a UE handover preparation controller 1140.

The UE controller 1110 is responsible for signaling procedure related to the data forwarding between the UE 190 and the FAF 180.

The IP controller 1120 receives the IP tunnel establishment request transmitted by the DFF 140 and establishes the IP tunnel with the DFF 140.

The data forwarding controller 1130 controls the process of receiving the handover packets forwarded by the DFF 140 through the IP tunnel established between the DFF 140 and the FAF 180 during the vertical handover procedure. In an exemplary embodiment of the present invention, the data forwarding controller 1130 controls such that the handover packets are transmitted to the target base station of the target network.

The UE handover preparation controller 1140 controls the processes related to the pre-registration procedure with the UE 190 in order to complete the authentication on the UE before the execution of the vertical handover between the heterogeneous networks. The UE handover preparation controller 1140 also controls the process related to the vertical handover of the UE from the serving network to the target network.

Figure 12:
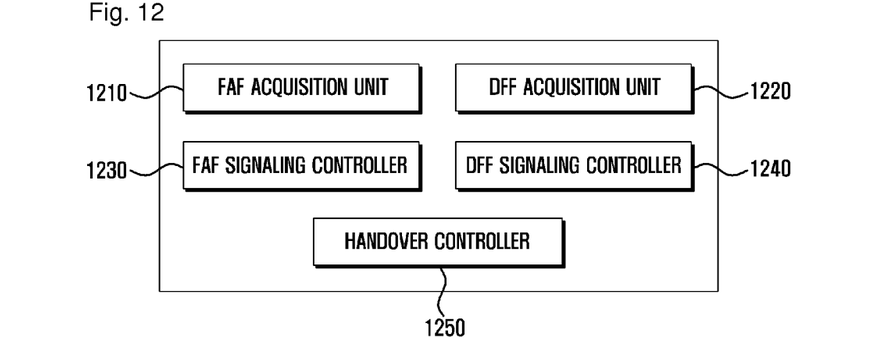
FIG. 12 is a block diagram illustrating a configuration of a UE for supporting the data forwarding in vertical handover according to an exemplary embodiment of the present invention.

FIG. 12 is a block diagram illustrating a configuration of a UE for supporting the data forwarding in vertical handover according to an exemplary embodiment of the present invention. As shown in FIG. 12, the UE includes an FAF acquisition unit 1210, a DFF acquisition unit 1220, an FAF signaling controller 1230, a DFF signaling controller 1240, and a handover controller 1250.

The FAF acquisition unit 1210 and the DFF acquisition unit 1220 acquire the IP addresses of the FAF 180 and the DFF 140 through a predetermined procedure, respectively. In an exemplary embodiment of the present invention, the predetermined procedure can be a DNS query procedure.

The FAF signaling controller 1230 controls all the signaling procedures between the UE 190 and the FAF 180. That is, the FAF signaling controller 1230 controls the signaling for the pre-registration procedure before the execution of the vertical handover.

The handover controller 1250 controls the processes related to the vertical handover of the UE from the serving network to a heterogeneous target network. In more detail, the handover controller 1250 controls the UE to hand over from the serving base station to the DFF 140 in response to the vertical handover request from the UE. The handover controller 1250 also controls the UE to hand over from the FAF 180 to the target base station when the intra-network handover is completed in the serving network.

As described above, the data forwarding method and system for a vertical handover according to the present invention is capable of forwarding data from the serving network to the target network during a vertical handover while the least change of the conventional network architecture, thereby efficiently reducing data loss during the vertically handover.

Although exemplary embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

The invention claimed is:

1. A data forwarding method of a data forwarding unit located in a serving network for a vertical handover, comprising:
   receiving an Internet Protocol (IP) address of a forwarding attachment unit located in a target network and a data forwarding preparation request that are transmitted by a user equipment;
   establishing an IP tunnel to the forwarding attachment unit according to the data forwarding preparation request;
   transmitting, to the user equipment, a response message comprising information of the IP tunnel establishing result; and
   forwarding, when a vertical handover is initiated, handover packets to the forwarding attachment unit through the IP tunnel.

2. The data forwarding method of claim 1, wherein forwarding handover packets comprises:
   receiving the handover packets from a serving base station; and transmitting the received handover packets to the forwarding attachment unit.

3. The data forwarding method of claim 1, wherein the forwarding preparation request comprises an interface type field of the data forwarding unit, a management message type field, a user equipment identifier field, an address type field of a target network router, and an address field of the target network router.

4. A data forwarding apparatus located in a serving network for a vertical handover, comprising:
   a user equipment controller configured to acquire an Internet Protocol (IP) address of a forwarding attachment unit located in a target network and a data forwarding preparation request from a user equipment;
   an IP tunnel controller configured to establish an IP tunnel with the forwarding attachment unit using the address acquired by the user equipment controller, and to transmit, to the user equipment, a response message comprising information of the IP tunnel establishing result; and
   a data forwarding controller configured to forward, when the vertical handover is initiated, handover packets buffered in a serving base station to the forwarding attachment unit through the IP tunnel.

* * * * *